(12) United States Patent
Sakaguchi et al.

(10) Patent No.: US 7,063,222 B2
(45) Date of Patent: Jun. 20, 2006

(54) PLASTIC CONTAINER

(75) Inventors: Toshiki Sakaguchi, Yokohama (JP);
Yuzuru Maruyama, Yokohama (JP);
Kenjiro Tanaka, Yokohama (JP)

(73) Assignee: Toyo Seikan Kaisha, Ltd., Tokyo (JP)

(*) Notice: Subject to any disclaimer, the term of this patent is extended or adjusted under 35 U.S.C. 154(b) by 132 days.

(21) Appl. No.: 10/181,150

(22) PCT Filed: Apr. 20, 2001

(86) PCT No.: PCT/JP01/03403

§ 371 (c)(1),
(2), (4) Date: Jul. 15, 2002

(87) PCT Pub. No.: WO02/46049

PCT Pub. Date: Jun. 13, 2002

(65) Prior Publication Data

US 2003/0000909 A1    Jan. 2, 2003

(30) Foreign Application Priority Data

Dec. 5, 2000 (JP) ............................... 2000-370688

(51) Int. Cl.
*B65D 1/02* (2006.01)
*B65D 1/46* (2006.01)
(52) U.S. Cl. ........................ 215/383; 215/379; 215/382; 215/384; 220/669; 220/671; 220/675
(58) Field of Classification Search .................... 25/40, 25/44, 383; 220/669, 675, 671, 672; 264/541; 215/40, 44, 383, 379, 382, 384, 381
See application file for complete search history.

(56) References Cited

U.S. PATENT DOCUMENTS

| | | | | |
|---|---|---|---|---|
| 852,360 A | * | 4/1907 | Warner | 215/383 |
| 1,648,344 A | * | 11/1927 | Hatcher | 428/13 |
| 2,723,779 A | * | 11/1955 | Parker et al. | 222/104 |
| 3,011,499 A | * | 12/1961 | Tajan | 401/139 |
| 3,029,963 A | * | 4/1962 | Evers | 215/373 |
| 3,097,058 A | * | 7/1963 | Branscum et al. | 427/184 |
| 3,100,576 A | * | 8/1963 | Frank | 215/382 |
| 3,126,139 A | * | 3/1964 | Schechter | 229/403 |
| 3,260,412 A | * | 7/1966 | Larkin | 222/107 |
| 3,263,847 A | * | 8/1966 | Amann | 215/382 |
| 3,353,714 A | * | 11/1967 | Trecek | 222/107 |
| 3,394,433 A | * | 7/1968 | Houvener | 425/131.5 |
| 3,395,821 A | * | 8/1968 | Fuerst et al. | 215/371 |
| 3,537,498 A | * | 11/1970 | Elmer | 604/403 |
| 3,949,038 A | * | 4/1976 | McChesney et al. | 264/535 |
| 3,956,441 A | * | 5/1976 | Uhlig | 264/530 |
| 4,456,134 A | * | 6/1984 | Cooper | 215/341 |

(Continued)

FOREIGN PATENT DOCUMENTS

EP         0573683 A1  *  12/1993

(Continued)

*Primary Examiner*—Sue A. Weaver
(74) *Attorney, Agent, or Firm*—Manabu Kanesaka

(57) ABSTRACT

In a plastic container manufactured by melting blow molding a heated and molten parison extruded from an extruder, a mouth 3 and/or a specified part of a body 2 has a thicker thickness than the body proper. One or more thick parts of the body 2 are continuously or discontinuously formed over part or all a peripheral, height or helical direction of the body of the container. The container enjoys enhanced rigidity, appearance and functionality even when the thickness of its body is considerably reduced.

4 Claims, 14 Drawing Sheets

U.S. PATENT DOCUMENTS

| | | | |
|---|---|---|---|
| 4,749,092 A * | 6/1988 | Sugiura et al. | 215/381 |
| 4,781,880 A * | 11/1988 | Robbins, III | 264/541 |
| 4,785,948 A * | 11/1988 | Strassheimer | 215/373 |
| 4,836,970 A * | 6/1989 | Robbins, III | 264/515 |
| 4,890,757 A * | 1/1990 | Robbins, III | 220/675 |
| 4,890,994 A * | 1/1990 | Shapler et al. | 425/131.1 |
| 4,930,644 A * | 6/1990 | Robbins, III | 215/382 |
| 5,027,963 A * | 7/1991 | Robbins, III | 215/395 |
| 5,086,937 A * | 2/1992 | Robinson | 215/398 |
| 5,217,128 A * | 6/1993 | Stenger | 215/370 |
| 5,393,216 A * | 2/1995 | Teutsch et al. | 425/133.1 |
| 5,704,504 A * | 1/1998 | Bueno | 215/381 |
| 6,112,925 A * | 9/2000 | Nahill et al. | 215/382 |
| 6,179,142 B1 * | 1/2001 | Hansen | 215/382 |
| 2001/0027978 A1 * | 10/2001 | Finley et al. | |
| 2002/0106417 A1 * | 8/2002 | Guillemette et al. | |

FOREIGN PATENT DOCUMENTS

| | | |
|---|---|---|
| EP | 1029793 A1 * | 8/2000 |
| GB | 2209511 A * | 5/1989 |
| JP | 62-202713 | 9/1987 |
| JP | 05-104525 | 4/1993 |
| JP | 8-119248 | 5/1996 |
| JP | 10-85639 | 4/1998 |
| JP | 11-348184 | 12/1999 |
| JP | 2000-6939 | 1/2000 |
| JP | 2001113589 A * | 4/2001 |

* cited by examiner

PLASTIC CONTAINER

TECHNICAL FIELD

The present invention relates to a plastic container with a mouth that is improved in strength, appearance and functionality by making the mouth and a specified portion of the body thicker than the body.

BACKGROUND ART

Demand for plastic containers such as bottles is expected to increase in the future. At the same time, many efforts are being made to reduce the thickness of bottles so as to lower their cost and reduce volume at the time of waste disposal.

Generally, plastic bottles are classified into two kinds by manufacturing method: direct blown bottles and draw blown bottles. In the direct blow method, plastic bottles are manufactured by blow molding a hot parison in a die immediately after heating, melting and then extruding the parison through the die head of an extruder (melt blow molding). In the draw blow method, plastic bottles are manufactured by cooling a parison extruded from an extruder or injected from an injector, thereafter heating the cooled parison again, to a temperature for drawing and then blow molding it in a die (stretch blow molding).

Conventionally, the method where a hot parison is blow molded just after extrusion from an extruder has been generally used in view of thermal economy.

In order to reduce the thickness of direct blow bottles, it is, taking blow ratio into account, necessary to extrude a parison as thin as possible from a die head.

In melt blow molding, the space between the core and the shell in a die head (die) is changed to adjust the thickness of the parison locally. Japanese Patent Laid-open No. S62 (1987)-202713 teaches a method for making the adjustment by moving the core upward or downward, whereas Japanese Patent Laid-open No. H5(1993)-104525 teaches a method for making the adjustment by changing the position of the shell.

In such a conventional technique of changing the space between the core and shell for adjusting the thickness of the parison, it is easy to gradually change the thickness in small degrees but it is difficult to abruptly change in the thickness by a large degree.

This is because a large taper angle of the core is required for abruptly changing the thickness of the parison in the die head. However, if the taper angle is large, the pressure for extruding the resin and the discharge amount of the resin cannot be sufficiently controlled. As a result, the thickness of the parison cannot be precisely adjusted. These methods are therefore not practical.

The conventional techniques are not capable of reducing the thickness of the body and shoulder while maintaining a specified thickness of the mouth. If the body and shoulder are made thinner, the mouth is disadvantageously made thinner at the same time. Such a thin mouth may deform at the time of capping, leading to insufficient sealing that may cause problems such as liquid leakage. Further, reamer finishing of the diameter and surface of the mouth becomes difficult.

By the conventional techniques, it was difficult to make only a part of the body thick, while maintaining a thin bottle thickness overall. Thus, there has been a limit to the degree that the thickness of a bottle can be reduced and still obtain the desired strength. There has also been a limit to the degree that a bottle can be imparted with decorative property and the degree that its direction of collapse during disposal can be controlled (the amount of functionality that can be imparted).

This invention was accomplished in light of the foregoing circumstances. One object of the invention is therefore to provide a plastic container, such as a bottle, of reduced thickness and enhanced strength, decorative appearance and functionality obtained by making the mouth and/or specified parts of the body thicker; and a method for manufacturing the plastic container.

SUMMARY OF THE INVENTION

The present invention provides a plastic container manufactured by melt blow molding a heated and molten parison extruded from an extruder, wherein a mouth of the container has a thickness of 1.0 to 5.0 mm, a body of the container has a thickness of 0.1 to 1.5 mm, and the thickness ratio of the mouth to the body is in the range of 3 to 50. The thickness of the plastic container preferably becomes abruptly thinner from the mouth to the shoulder of the container.

In the so-configured plastic container, even if the thickness of the body is made as thin as possible, the thickness of the mouth can be thick enough not to be deformed. Thus, the container of the present invention can solve the problems of imperfect capping and difficult reaming.

The present invention provides a plastic container manufactured by melt blow molding a heated and molten parison extruded from an extruder, a specified part of the body of the container having increased thickness. In this container, only the specified part of the body of the container is thick and the body is thin overall.

The container wherein only a specified part of the body is thick can be embodied in various ways. For example, one or a plurality of thick parts can be continuously or discontinuously formed over part or all of the periphery of the body of the container. One or a plurality of thick parts can be continuously or discontinuously formed over part or all of the height of the body of the container. One or a plurality of thick parts can be continuously or discontinuously formed helically over part or all of the body of the container.

In the above embodiments, the thickness ratio of the thick parts to the body is preferably in the range of 1.5 to 10.0.

As stated above, by forming one or a plurality of thick parts continuously or discontinuously over part or all of the body in any direction, the strength of the body can be enhanced, the body can be imparted with decorative property, and/or the functionality of the container can be improved.

This invention also directed to a method for manufacturing the plastic containers. Specifically, this invention provides a method for manufacturing a plastic container by melt blow molding a heated and molten parison extruded from an extruder, wherein resin is added to a part of the parison corresponding to the mouth and/or a specified part of the body of the container in a prescribed amount such that the mouth and/or the specified part of the body becomes thicker than the body when the container is molded.

The prescribed amount of the resin is preferably added when the parison is extruded and molded by supplying the resin from a discharge outlet provided in the die head of the extruder.

By the method, a prescribed amount of resin is added to a specified part of a parison (corresponding to the mouth and/or a thick part of the body) at the time when the parison is molded.

According to the method of the present invention, by forming one or a plurality of thick parts continuously or discontinuously in the mouth, and in any direction over part or all of the body, a plastic container can be easily and precisely manufactured to have higher strength in the mouth and body, a decorative appearance, and/or improved functionality.

The term "body" is sometimes used herein with regard to an invention container having a neck and a shoulder to include the neck and the shoulder.

BEST MODE OF CARRYING OUT THE INVENTION

Embodiments of the plastic container and the method for manufacturing the plastic container according to the present invention will be explained.

FIRST EMBODIMENT OF PLASTIC CONTAINER

First, a first embodiment will be explained in which the present invention is applied to the mouth of a bottle.

Figure 1:
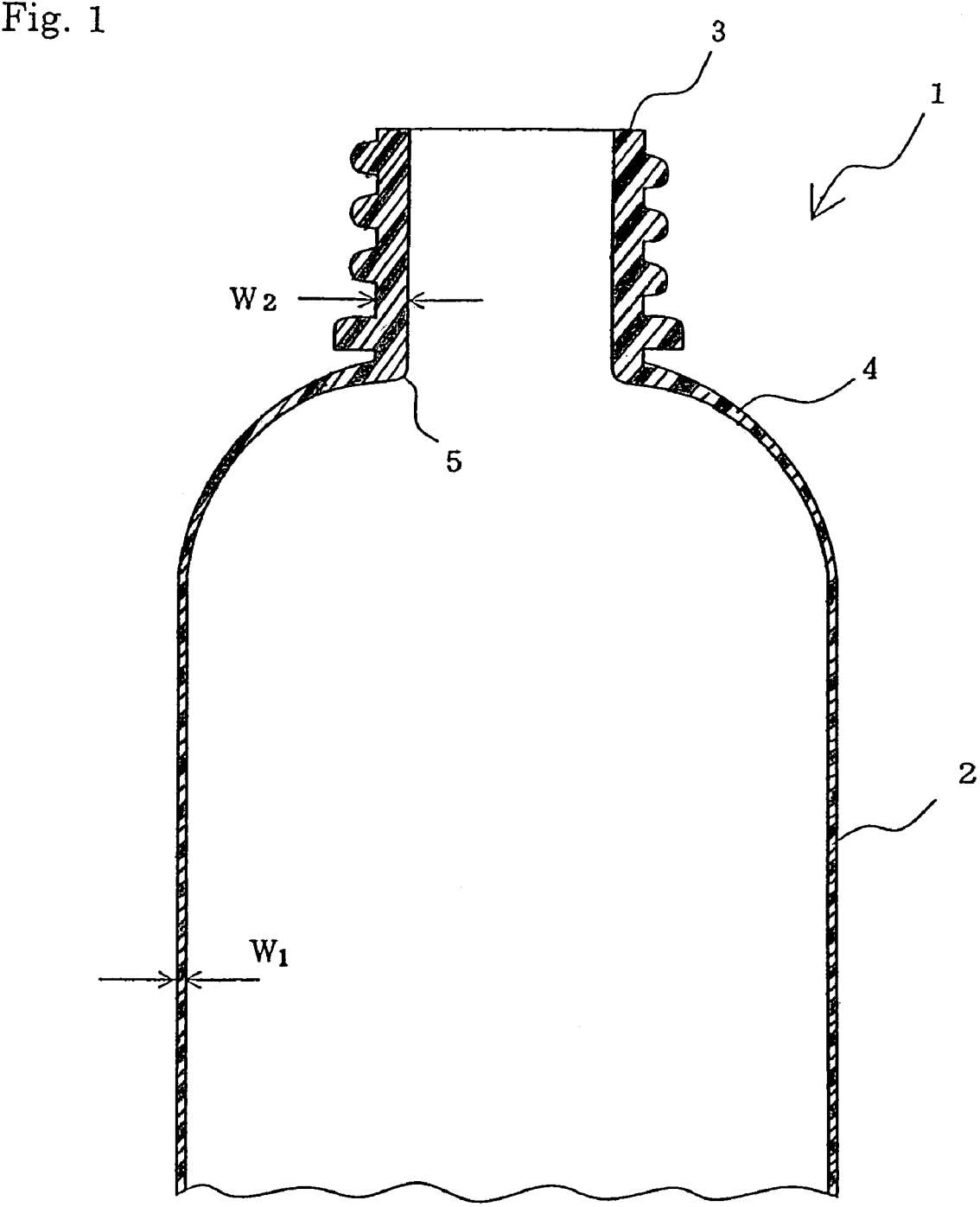
FIG. 1 is a sectional view of an essential part of a bottle according to a first embodiment of the present invention.

FIG. 1 is a sectional view of an essential part of the plastic container according to the first embodiment.

A bottle 1 is manufactured by extruding a heated and molten parison through the die head of an extruder and blow molding it. For ordinary bottles having a volume of 300 ml to 2000 ml, the thickness $W_1$ of the body 2 is 0.3 to 1.3 mm and the thickness $W_2$ of the mouth 3 is 1.0 to 5.0 mm. The ratio of the thickness $W_2$ of the mouth 3 to the thickness $W_1$ of the body 2 is in the range of 3.3 to 17.

If the volume of the bottle is smaller than the above value, the thickness ratio of the body 2 to the mouth 3 becomes smaller. If the volume of the bottle is larger than the above value, the thickness ratio of the body 2 to the mouth 3 becomes larger. In this case, the thickness $W_1$ of the body 2 can be 0.1 to 1.5 mm and the ratio of the thickness $W_2$ of the mouth 3 to the thickness $W_1$ of the body 2 can be in the range of 3 to 50.

If the ratio of the thickness $W_2$ of the mouth 3 to the thickness $W_1$ of the body 2 is smaller than 3, the strength of the body is weak, while if the ratio exceeds 50, the thickness of the body is too large.

Figure 2:
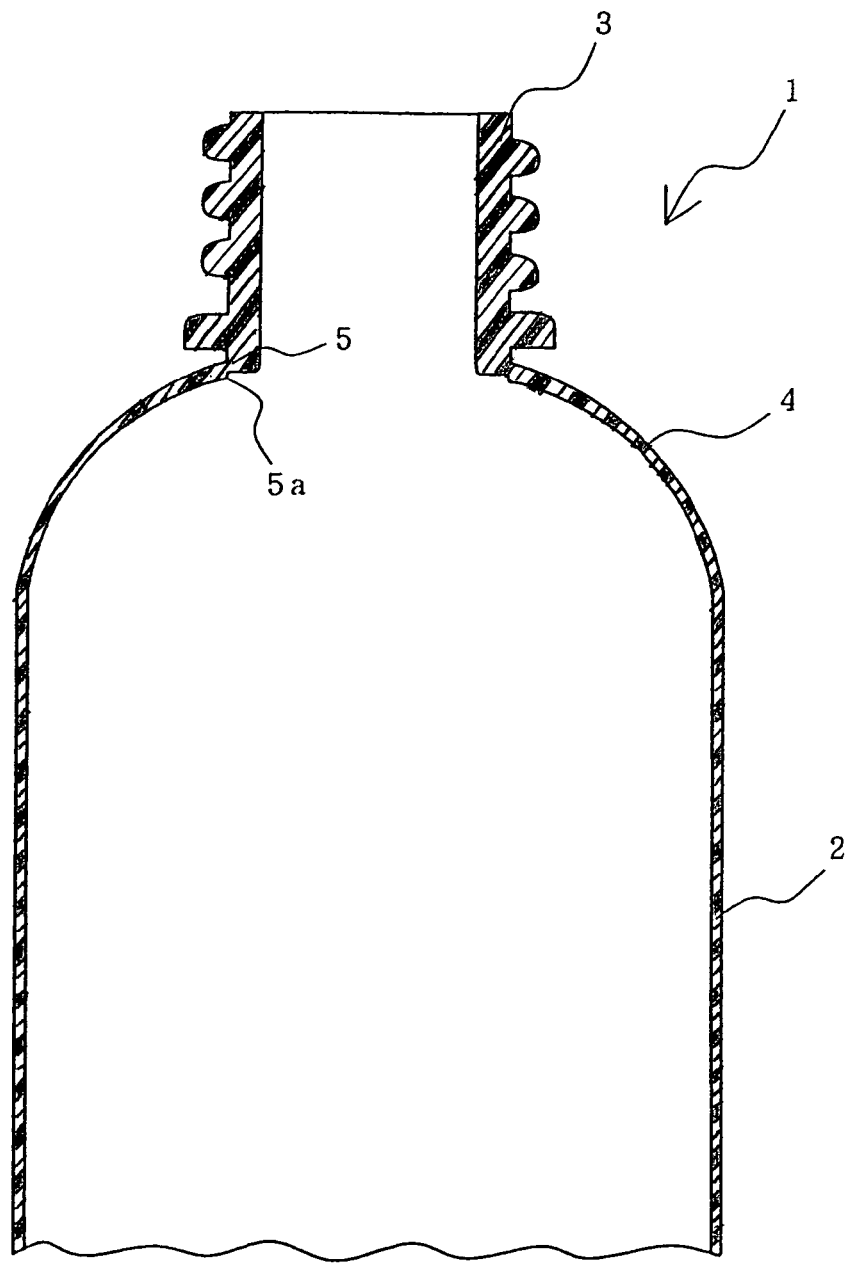
FIG. 2 is a sectional view of an essential part of another bottle according to the first embodiment of the present invention.

The thickness of the shoulder 4 between the mouth 3 and the body 2 becomes abruptly thinner from the connection 5 between the mouth 3 and the shoulder 4. The shoulder 4 can be shaped so that its thickness becomes continuously thinner without any step as shown in FIG. 1 or becomes abruptly thinner with a step 5a as shown in FIG. 2.

In this embodiment, while the resin added at the mouth 3 is preferably the same as that of the bottle body, use of a different resin is acceptable. The resin(s) used are decided based on the material properties, use, size and the like of the bottle. The addition amount of the resin is also controlled based on the material properties, use, size and the like of the bottle.

METHOD FOR MANUFACTURING BOTTLE OF FIRST EMBODIMENT

Next, a method of manufacturing bottles according to a first embodiment will be explained.

Figure 3:
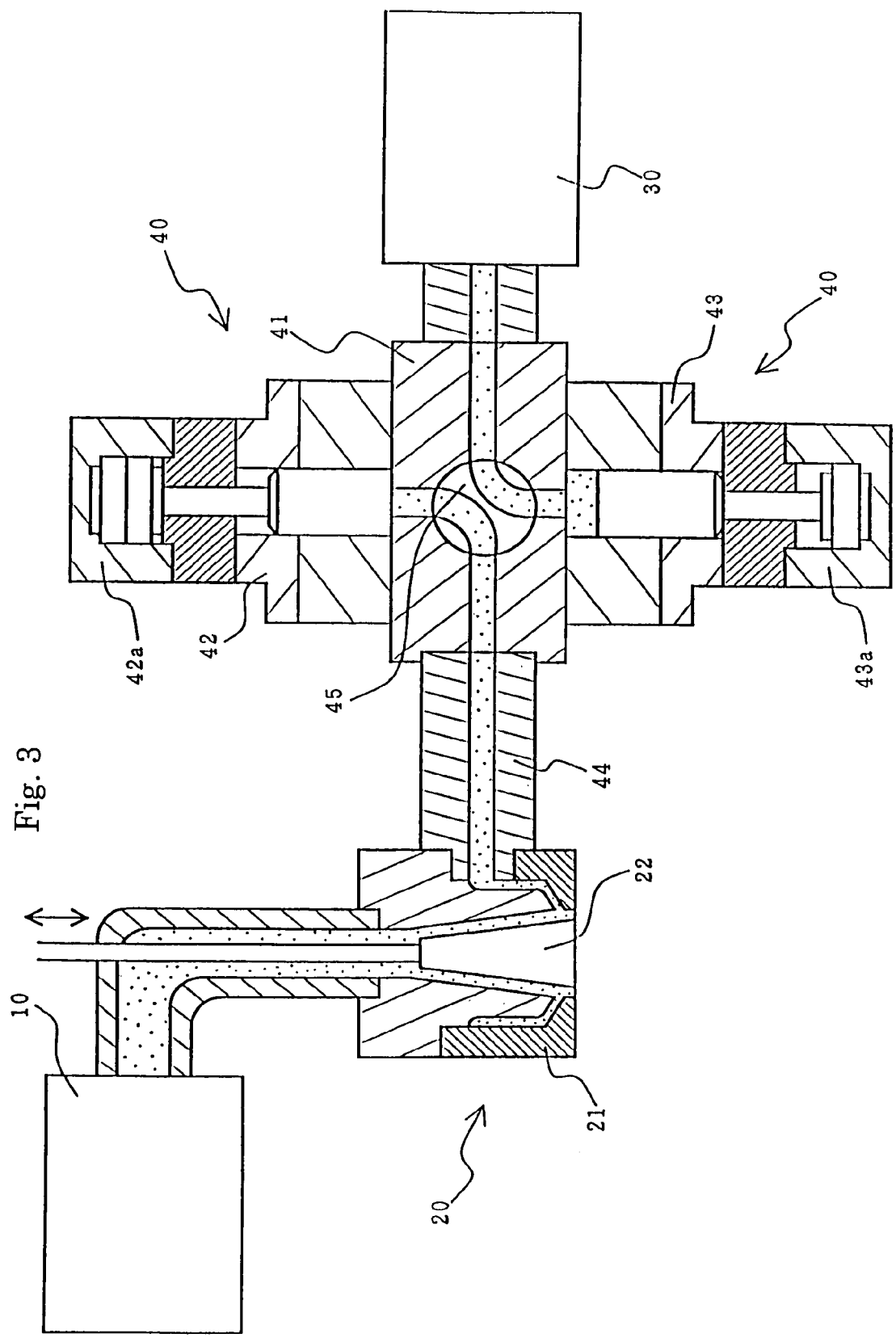
FIG. 3 is a diagrammatic sectional view of a parison molding device used in a method of manufacturing a bottle according to the first embodiment of the present invention.

FIG. 3 is a diagrammatic view showing a molding device used in the method of manufacturing bottles.

The device for molding a parison has a main extruder 10, a die head 20, a sub-extruder 30, storage units 40 and a switching unit 41.

The main extruder 10 heats and melts a thermoplastic resin and continuously supplies it to the die head 20. In the die head 20, the space between a shell 21 and a core 22 can be adjusted in accordance with instructions output by a controller (not shown) based on a parison control program. The die head 20 extrudes the molten resin extruded from the extruder 10 while controlling the thickness of the parts of the parison corresponding to the respective parts of the bottle.

The parison extruded from the die head 20 is immediately supplied to an ordinary blow molding device (not shown) to be molded into a bottle in an ordinary manner.

The sub-extruder 30 has storage units 40 for temporarily storing molten resin and a switching unit 41 for switching between storage and supply of the resin to intermittently extrude the molten resin. A prescribed amount of the molten resin extruded from the sub-extruder 30 is intermittently supplied via the storage units 40, the switching unit 41 and a path 44 communicating the storage units 40 with the die head 20.

The storage units 40 are provided with two accumulators 42, 43, and the switching unit 41 is provided with a switching valve 45. The switching valve 45 alternately makes and breaks connection between the two accumulators 42, 43 and the sub-extruder 30. Further the valve 45 alternately makes and breaks connection between the two accumulators 42, 43 and the communicating path 44.

The switching valve 45 and two accumulators 42, 43 also operate according to instructions output by the controller (not shown in FIG. 3) based on the parison control program.

Specifically the accumulator 42 is charged with a prescribed amount of resin extruded from the sub-extruder 30 via the switching valve 45. The program designates that a specified portion of the parison (corresponding to the mouth of the bottle) is to be made thicker. Once the specified portion has moved to the outlet of the die head 20, the switching valve 45 is switched according to instructions from the controller, and the accumulator 42 operates to supply the charged molten resin to the die head 20 via the communicating path 44, thereby adding the resin to the specified portion of the parison.

At this time, the switching valve 45 connects the accumulator 42 to the communicating path 44 and simultaneously connects the accumulator 43 to the sub-extruder 30 to charge the accumulator 43 with resin extruded from the sub-extruder 30, as shown in FIG. 3.

As mentioned above, the two accumulators 42, 43 are alternately charged with molten resin from the sub-extruder 30, and alternately supply a prescribed amount of the molten resin to the die head 20.

The switching valve 45 is operated by a cylinder (not shown). The accumulators 42, 43 are operated by cylinders 42a, 43a, respectively.

The sub-extruder 30 is not limited to an extruder which continuously extrudes resin at a constant rate. It may instead be an extruder with a reciprocating screw which intermittently extrudes resin at a constant rate. When such an extruder is used, the reciprocating motion of the screw of the sub-extruder 30 is controlled in synchronism with the movement of the switching valve 45 and the accumulators 42, 43.

As explained above, a prescribed amount of molten resin supplied from the sub-extruder 30 is added to the specified portion of the parison (corresponding to the mouth of the bottle). The parison is immediately held by a pair of dies (not shown) and pressurized air is then blown for melt blow molding to produce a bottle. Even if the parison is subjected to melting blow molding so as to make the body 2 and shoulder 4 of the bottle 1 thin, the mouth 3 can be molded to have the required thickness.

The resin forming the parison is preferably the same as the resin added to a mouth, but can be different.

Although a monolayer die head is used in this embodiment, a die head for forming multiple layers may be similarly used. In this case, a bottle with a thick body as well as a thick mouth is obtained. A plastic container with a thick body and a manufacturing method thereof will be explained in the second embodiment.

EXAMPLES

Bottles manufactured by the method of this embodiment will be compared with those manufactured using a conventional die and merely adjusting the space between the shell and the core.

Invention Example

Bottles were manufactured under the following conditions by using the molding device as shown in FIG. 3.

| | | |
|---|---|---|
| (1) | Main Extruder | |
| | Material: | High density polyethylene (melting point 132° C.) |
| | Temperature of Molten Resin: | 200° C. |
| | Discharge Rate: | 15 Kg/h |
| (2) | Sub-extruder | |
| | Material: | High density polyethylene (melting point 132° C.) |
| | Temperature of Molten Resin: | 200° C. |
| | Discharge Rate: | 1 Kg/h |
| (3) | Temperature of Die Head: | 200° C. |
| (4) | Bottle | |
| | Volume: | 1000 ml |
| | Body Thickness: | 0.5 mm |
| | Mouth Thickness: | 2.2 mm |
| | Body Inner Diameter: | 115 mm |
| | Mouth Inner Diameter: | 18 mm |
| | Thickness Ratio of Mouth to Body: | 4.4 |

Comparative Example

Figure 4:
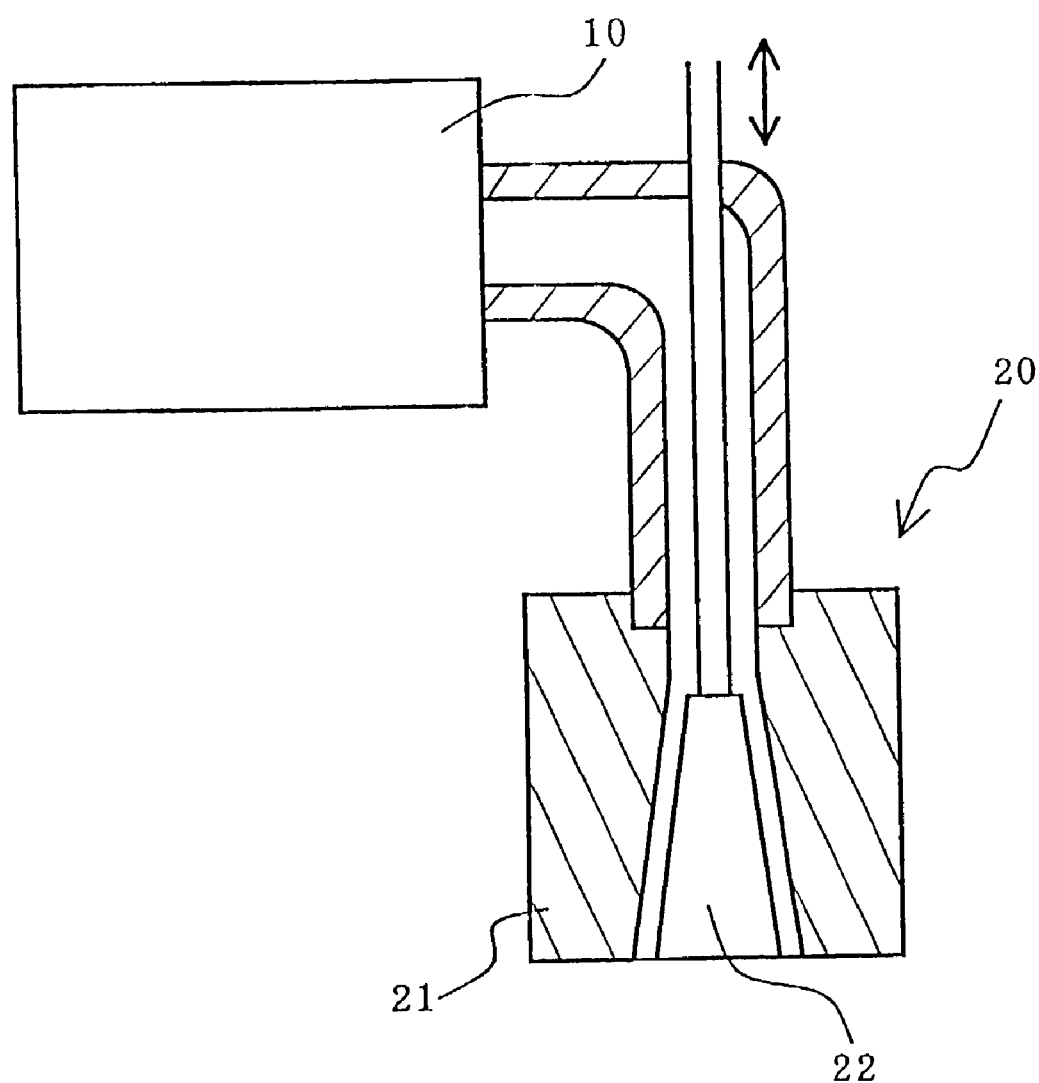
FIG. 4 is a diagrammatic sectional view of a parison molding device used in a comparative example.

Bottles were manufactured under the following conditions using the molding device as shown in FIG. 4. In FIG. 4, a blow molding section is not shown.

| | | |
|---|---|---|
| (1) | Main Extruder | |
| | Material: | High density polyethylene (melting point 132° C.) |
| | Temperature of Molten Resin: | 200° C. |
| | Discharge Rate: | 15 Kg/h |
| (2) | Temperature of Die Head: | 200° C. |
| (3) | Bottle | |
| | Volume: | 1000 ml |
| | Body Thickness: | 0.5 mm |
| | Mouth Thickness: | 1.2 mm |
| | Body Inner Diameter: | 115 mm |
| | Mouth Inner Diameter: | 18 mm |
| | Thickness Ratio of Mouth to Body: | 2.4 |

In the case where bottles were manufactured by the method according to the embodiment of the present invention, even if the body was made considerably thin, the thickness of the mouth could be maintained at the required thickness. On the contrary, in the case where bottles were manufactured by the conventional method, if the body was made considerably thin, the thickness of the mouth was inevitably thin. Satisfactory capping and reaming could not be performed, resulting in defective products.

According to the first embodiment of the present invention, the body can be reduced to the minimum practical thickness while maintaining a large mouth thickness.

SECOND EMBODIMENT OF PLASTIC CONTAINER

FIGS. 5 to 13 show bottles according a second embodiment obtained by applying the present invention to the bottle body.

Figure 5:
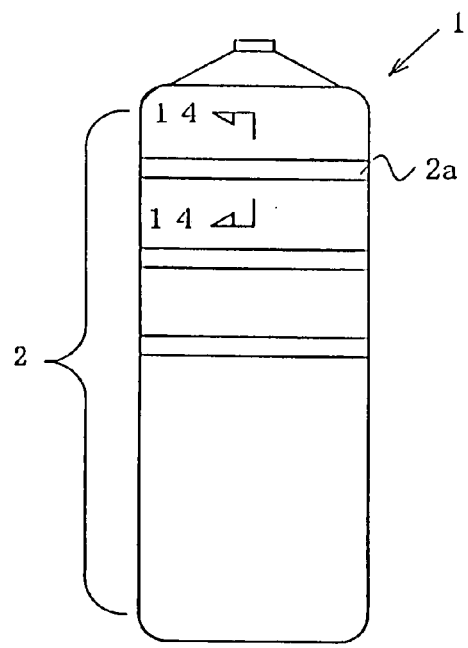
FIG. 5 is a front view of a bottle according to a second embodiment of the present invention.

In the example shown in FIG. 5, three ring-like thick parts 2*a* are circumferentially formed in the upper part of the body 2 of a bottle 1. Alternatively, as shown in FIG. 6, the body 2 can be formed with discontinuous thick parts 2*b*.

Figure 6:
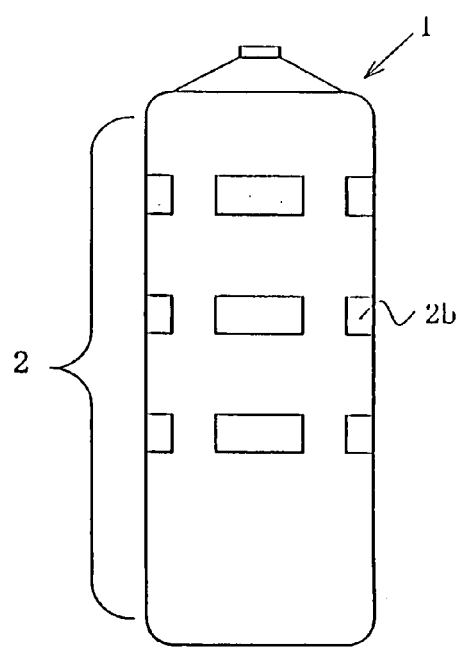
FIG. 6 is a front view of another bottle according to the second embodiment of the present invention.

When ring-like thick parts are circumferentially formed in the body of a bottle as shown in FIGS. 5 and 6, even if the thickness of the bottle is thin, the strength is enhanced in the diameter direction so that the graspability of the bottle is improved. Further, if pressure is applied to the body 2 in the axial direction at the time of disposal, the bottle 1 will collapse in the axial direction like bellows. That is to say, the functionality of the bottle can be improved; for example, the volume of the bottle can be decreased and the bottle can be made easy to dispose of.

Figure 14:
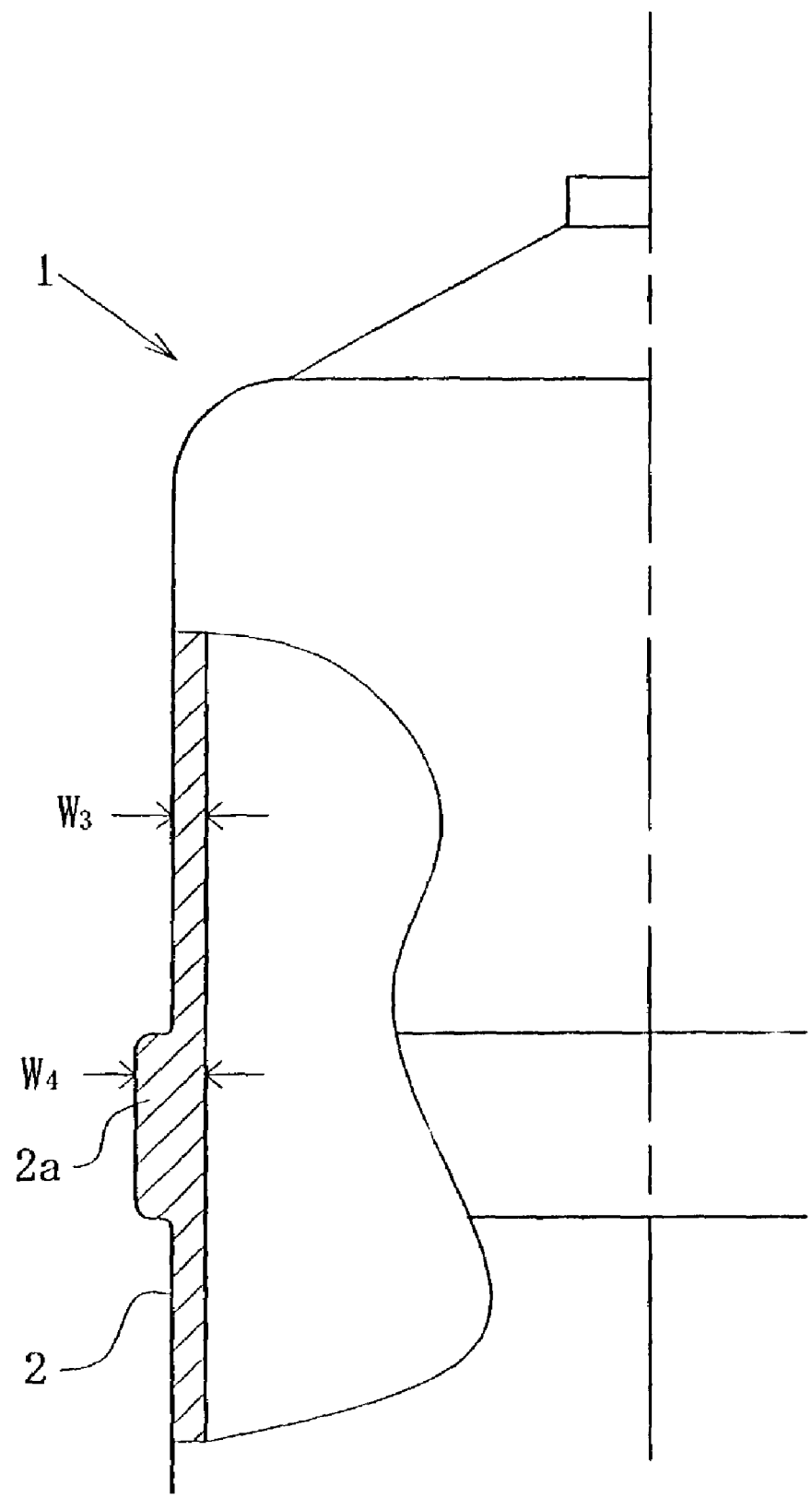
FIG. 14 is a sectional view taken along line 14—14 in FIG. 5.

The thick parts 2*a* can be distributed over the entire axial length of the body or at any given region thereof. The number and width of the parts 2*a* can be properly determined based on the purpose of the bottle. The parts 2*a* can be formed to protrude integrally outward from the body 2 as shown in FIG. 14 by matching the shape of the die for molding the bottle to the position and width of the parts 2*a*.

Figure 7:
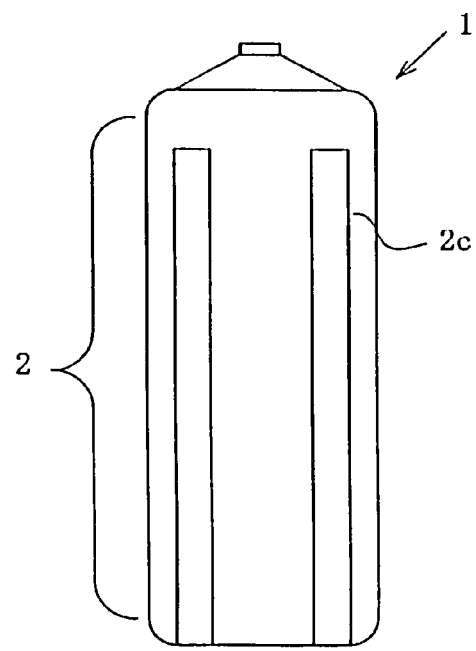
FIG. 7 is a front view of another bottle according to the second embodiment of the present invention.
Figure 8:
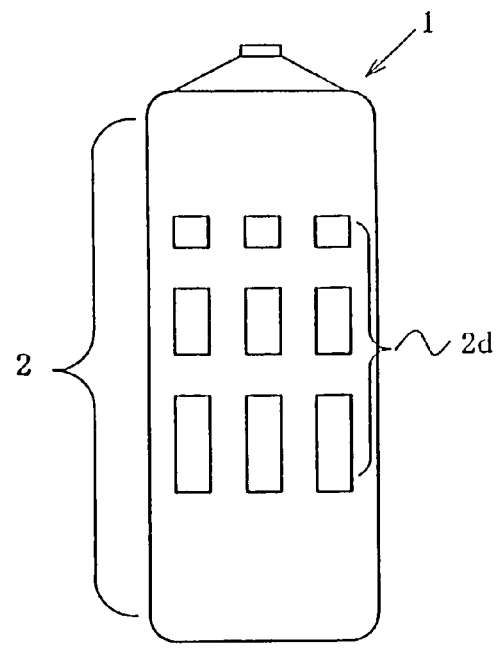
FIG. 8 is a front view of another bottle according to the second embodiment of the present invention.

In the example shown in FIG. 7, a plurality of stripe-like thick parts 2*c* are formed along substantially the entire axial length of the body. When the bottle 1 is given the shape of a square column, the thick parts 2*c* can be arranged on all or any side surface of the body 2. When the bottle 1 is given a cylindrical shape, the thick parts can be arranged on the peripheral surface at regular or irregular intervals. Further, the thick parts 2*d* can be arranged discontinuously. In the case of discontinuous thick parts, their sizes can be varied, as shown in FIG. 8.

By forming thick parts along the axial direction of a bottle body, the strength of the bottle is enhanced along the axial direction. This enables them to be stacked after filling. Further, if pressure is applied to the bottle from its sides at the time of disposal, the bottle will collapse in the diameter direction to assume a plate-like shape, so that the volume can be easily decreased.

In the case where thick part(s) are arranged along the axial direction, the part(s) can be distributed over all or any part in the axial direction. The number and width of the parts can be properly determined according to the purpose of the bottle.

Figure 9:
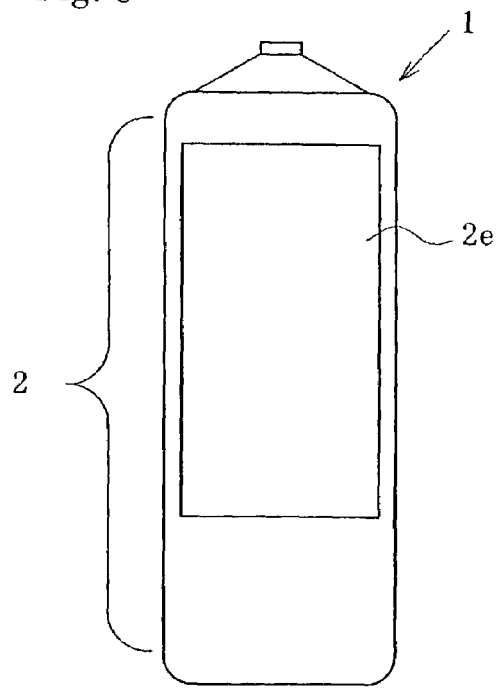
FIG. 9 is a front view of another bottle according to the second embodiment of the present invention.

In the example shown in FIG. 9, a patch-like thick part 2*e* is formed at one or more parts of the body 2. If such a patch-like thick part 2*e* is formed at a handle part of the bottle 1, the thin handle part can be reinforced to make the bottle easier to hold and the strength can be enhanced against shock such as at dropping. If the patch-like thick part is formed at a part corresponding to an in-mold-label, it functions as a reinforcement for preventing breakage at the label edge. If it is formed at a part to be printed, the functionality of the bottle, such as the rigidity at the time of printing and inkability, is improved.

Like the above-mentioned thick parts, the patch-like thick parts 2*e* can be formed in any size. If a colored resin, glossy resin, mat resin or pearlized resin is used, a bottle with a distinctive appearance can be obtained.

Figure 10:
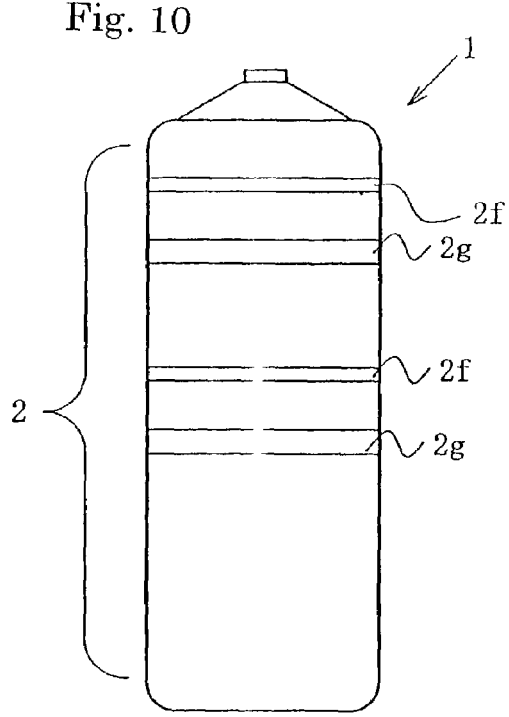
FIG. 10 is a front view of another bottle according to the second embodiment of the present invention.

In the example shown in FIG. 10, thick parts 2*f* and thick parts 2*g* of different width are alternately formed in the periphery like rings.

Since resin is added in sets of two or more rings, resins with various kinds or colors can be added to obtain a bottle having improved appearance in addition to advantages like those of the bottle of FIG. 5.

Figure 11:
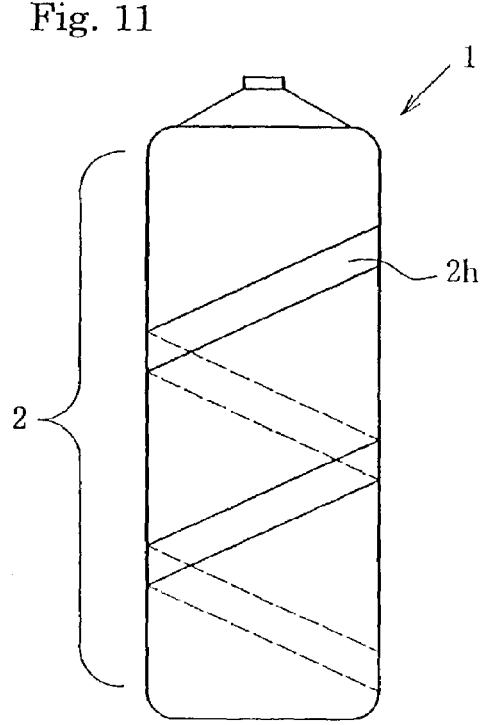
FIG. 11 is a front view of another bottle according to the second embodiment of the present invention.

In the example shown in FIG. 11, a thick part 2*h* is helically formed in the body periphery. In the example shown in FIG. 12, the bottle 1 is shaped like a square column and a thick parts 2*i* are formed obliquely on any or all side surfaces of the bottle 1.

A bottle formed helically or obliquely with the thick part 2*h* or 2*i* has the sane advantages as those of a bottle reinforced in both the axial and circumferential directions.

In the case where one or more thick parts are formed helically or obliquely, the parts can be distributed over all or any part of the peripheral surface of the body, as in the above-mentioned bottles. The number and width of the parts can be properly determined depending on the purpose of the bottle.

In the bottles shown in FIGS. 5 to 12 and the above-mentioned other modified bottles, the thick parts 2*a* to 2*i* are formed in the various shapes and therefore also function to decorate the bottles. If a colored resin, glossy resin, mat resin or pearlized resin is used as the resin constituting the thick parts 2*a* to 2*i*, the decorating function is enhanced and the appearance of the bottles is effectively improved.

Figure 13:
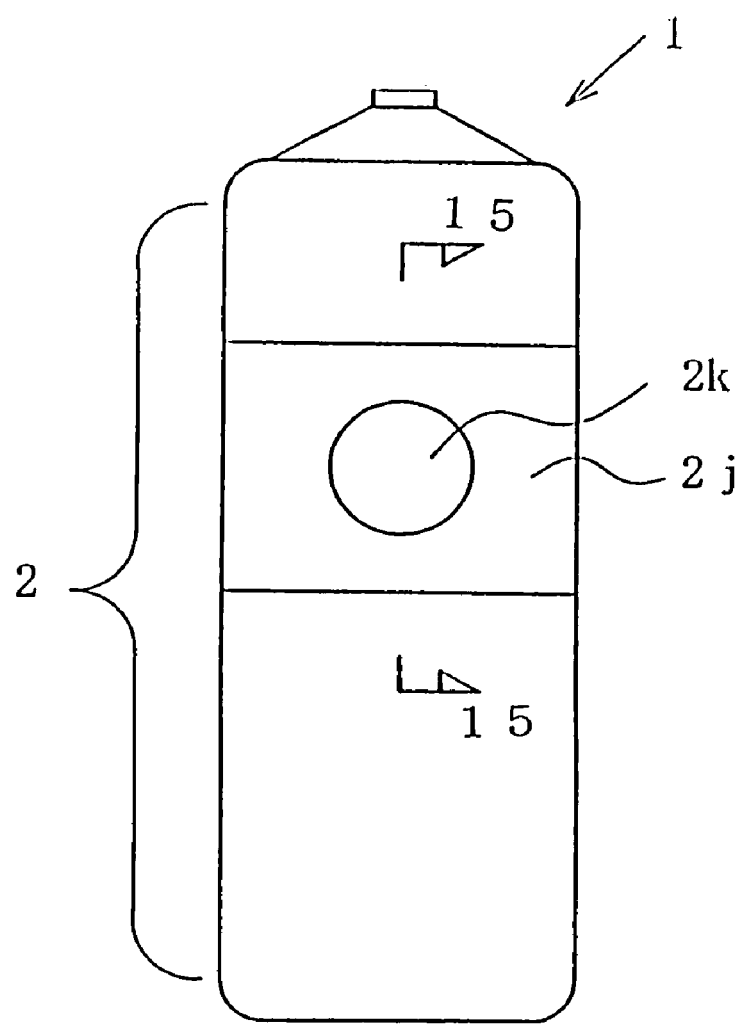
FIG. 13 is a front view of another bottle according to the second embodiment of the present invention.
Figure 15:
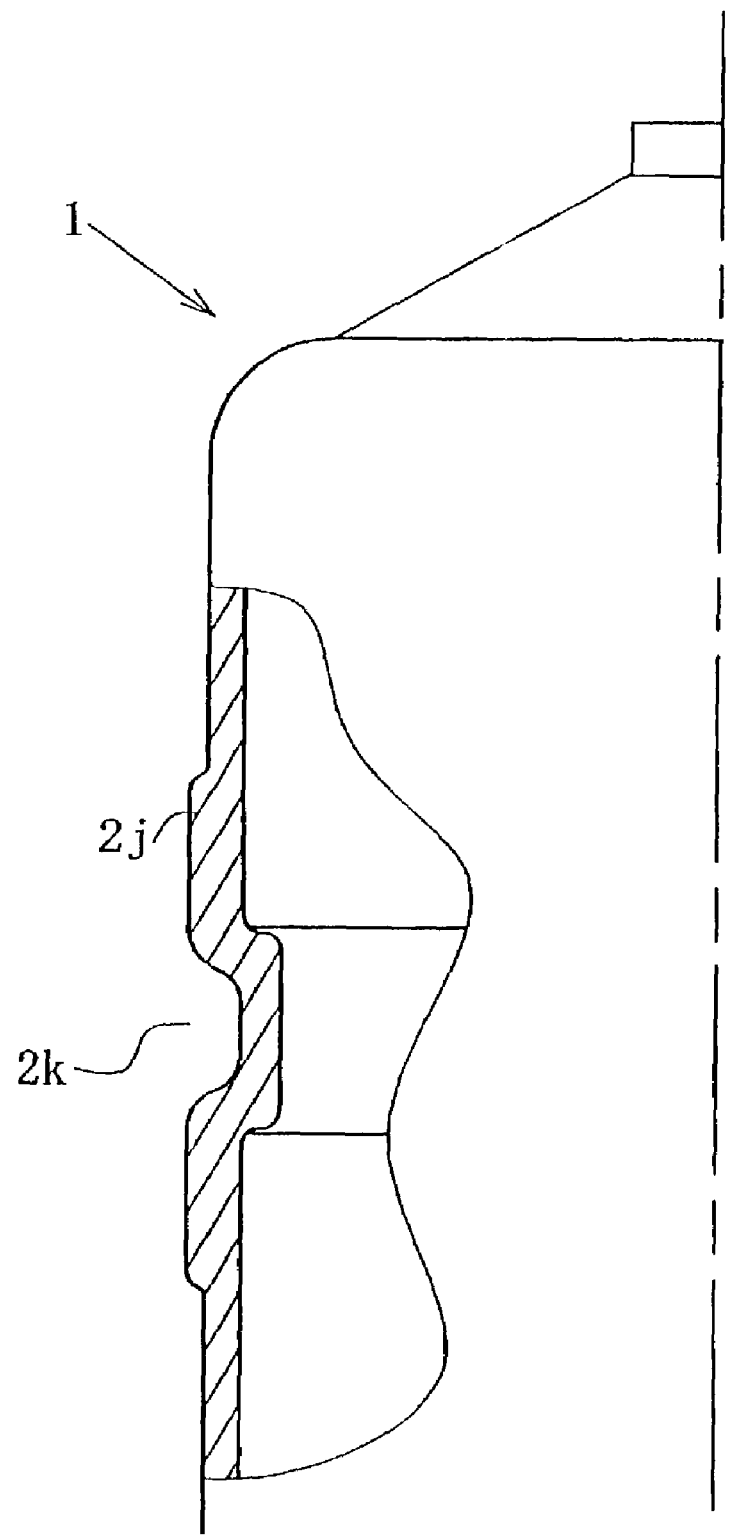
FIG. 15 is a sectional view taken along line 15—15 in FIG. 13.

In the example shown in FIGS. 13 and 15, a thick part 2*j* is circumferentially formed in the body 2 and concave parts 2*k* (only one shown) for finger insertion are formed in the part 2*j* at diametrically opposed portions.

Even if the overall thickness of the body 2 is thin, the provision of the parts 2*j*, 2*k* give the bottle 1 excellent graspability so that the user can firmly hold the bottle 1. In addition, the user can securely hold the bottle 1 by inserting fingers into the concave parts 2*k*.

The bottles of the above examples are manufactured by extruding a heated and molten parison through the die head of an extruder and blow molding it. For 300 ml to 2000 ml bottles currently in general use, the thickness $W_3$ of a body 2 is 0.3 to 1.3 mm and the thickness $W_4$ of thick parts 2*a* to 2*j* is 0.5 to 2.0 mm. The ratio of the thickness $W_4$ of the thick parts 2*a* to 2*j* to the thickness $W_3$ of the body 2 is in the range of 1.5 to 5.0.

If the volume of the bottle is smaller than the above value, the thickness ratio of the body to the thick parts becomes smaller. If the volume of a bottle is larger than the above value, the thickness ratio of a body to the thick parts becomes larger. In this case, the thickness $W_3$ of the body 2 can be 0.1 to 1.5 mm and the ratio of the thickness $W_4$ of the thick parts 2*a* to 2*j* to the thickness $W_3$ of the body 2 can be in the range of 5.0 to 10.0.

A preferred ratio of the thickness $W_4$ of the thick parts 2*a* to 2*j* to the thickness $W_3$ of the body 2 is in the range of 1.5 to 10.0. If the ratio of the thickness $W_4$ to the thickness $W_3$ is smaller than 1.5, the thickness of the thick parts 2 becomes insufficient so that the advantages of the invention cannot be satisfactorily obtained, while if the ratio is greater than 10, the thick parts become unnecessarily thick.

In the bottles of this embodiment, the resin added to the thick parts 2*a* to 2*j* can be the same as or different from that of the body proper of the bottle. The resin(s) used are decided based on the material properties, use, size and the like of the bottle. The addition amount of the resin is also controlled based on the material properties, use, size and the like of the bottle.

METHOD FOR MANUFACTURING BOTTLE OF SECOND EMBODIMENT

Next, a method of manufacturing bottles according to a second embodiment will be explained.

Figure 16:
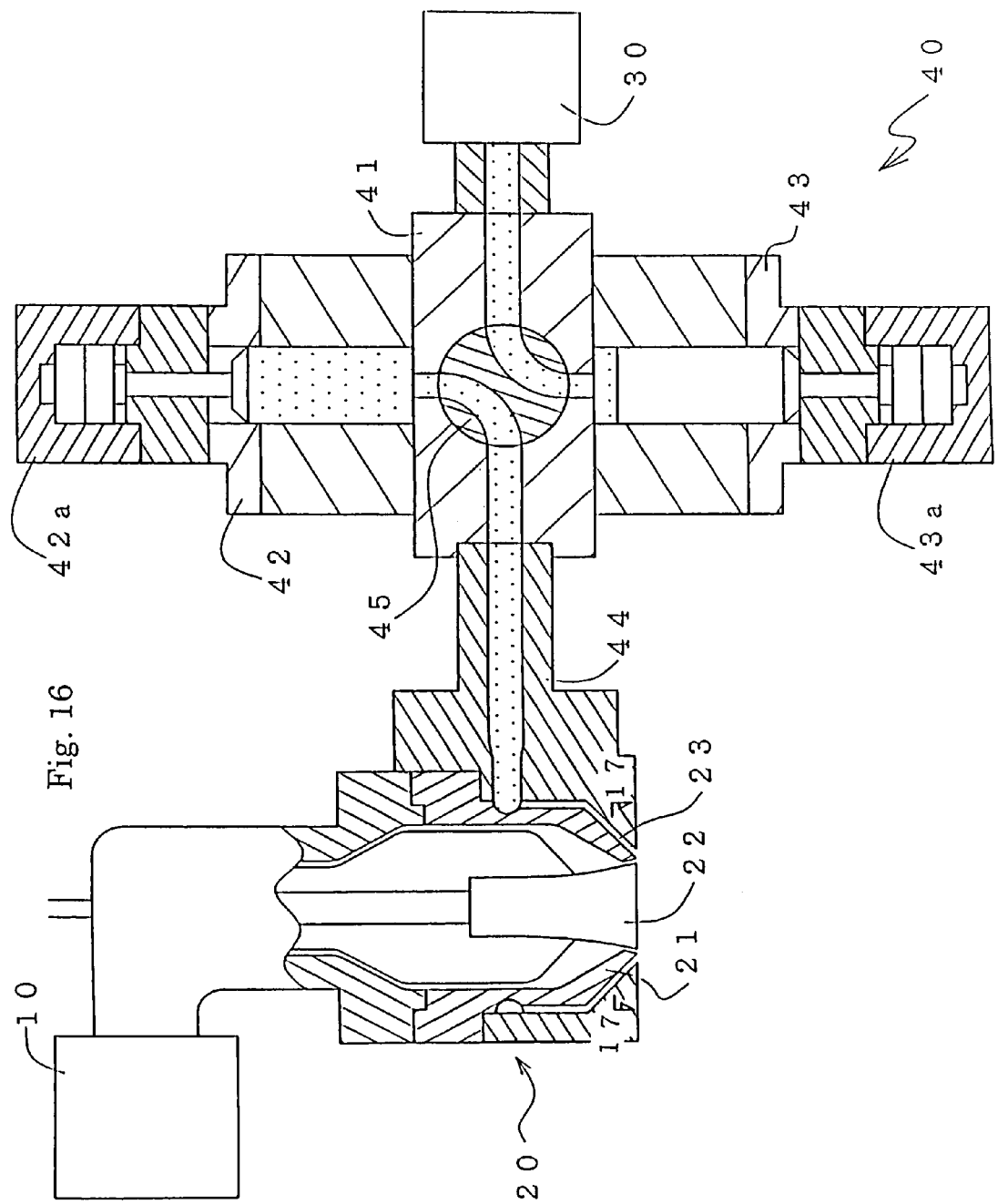
FIG. 16 is a diagrammatic sectional view of a parison molding device with a monolayer die head used in a method of manufacturing a bottle according to the second embodiment of the present invention.

FIG. 16 is a diagrammatic view showing a molding device used in the method of manufacturing bottles. The device for molding a parison shown in FIG. 16 has a main extruder 10, a die head 20, a sub-extruder 30, storage units 40 and a switching unit 41. The structure of parts other than the die head 20 is similar to that of the molding device shown in FIG. 3.

Thus, most of the method of manufacturing bottles according to the second embodiment is the same as the method of manufacturing bottles according to the first embodiment.

The die head 20 shown in FIG. 16 is provided under a shell 21 with a discharge outlet 23 for adding molten resin.

A die with concave parts corresponding to the thick parts of the bottle can be used as the die in the blow molding device (not shown). If a die without any concave or convex parts on the surface thereof is used, thick parts are formed inward of the inner surface of a bottle. However, if concave parts are formed on the surface of the die in correspondence to the thick parts, the thick parts are protruded outward from the body and the thickness thereof is defined by the depth of the concave parts.

For a die used to mold bottles with concave parts 2k formed midway between thick part 2j as shown in FIGS. 13 and 15, convex parts are formed at the parts corresponding to the concave parts 2k. The depth of the concave parts 2k can be adjusted by adjusting the height of the convex parts.

The sub-extruder 30 intermittently supplies molten resin to the outlet 23 of the die head 20 via the storage units 40, the switching unit 41, and a path 44 communicating the storage units 40 with the die head 20.

Specifically, a parison control program designates that a specified portion of the parison (corresponding to a thick part of the bottle) is to be made thicker. Once the specified portion has moved to the outlet of the die head 20, the switching valve 45 is switched according to instructions from the controller, and the accumulator 42 operates to supply charged molten resin to the outlet 23 located at the lower part of the die head 20 via the communicating path 44, thereby adding the resin to the specified portion of the parison.

As mentioned above, the specified portion of the parison (corresponding to the thick part of the bottle) is added with a prescribed amount of molten resin supplied from the sub-extruder 30. The parison is immediately held by a pair of dies (not shown), and pressurized air is then blown for melt blow molding to produce a bottle. Even if the parison is subjected to melt blow molding so as to make the body of a bottle 1 thin, the specified part can be molded to be thick.

Next, die heads 20 used in the method of manufacturing bottles will be explained.

Figure 18:
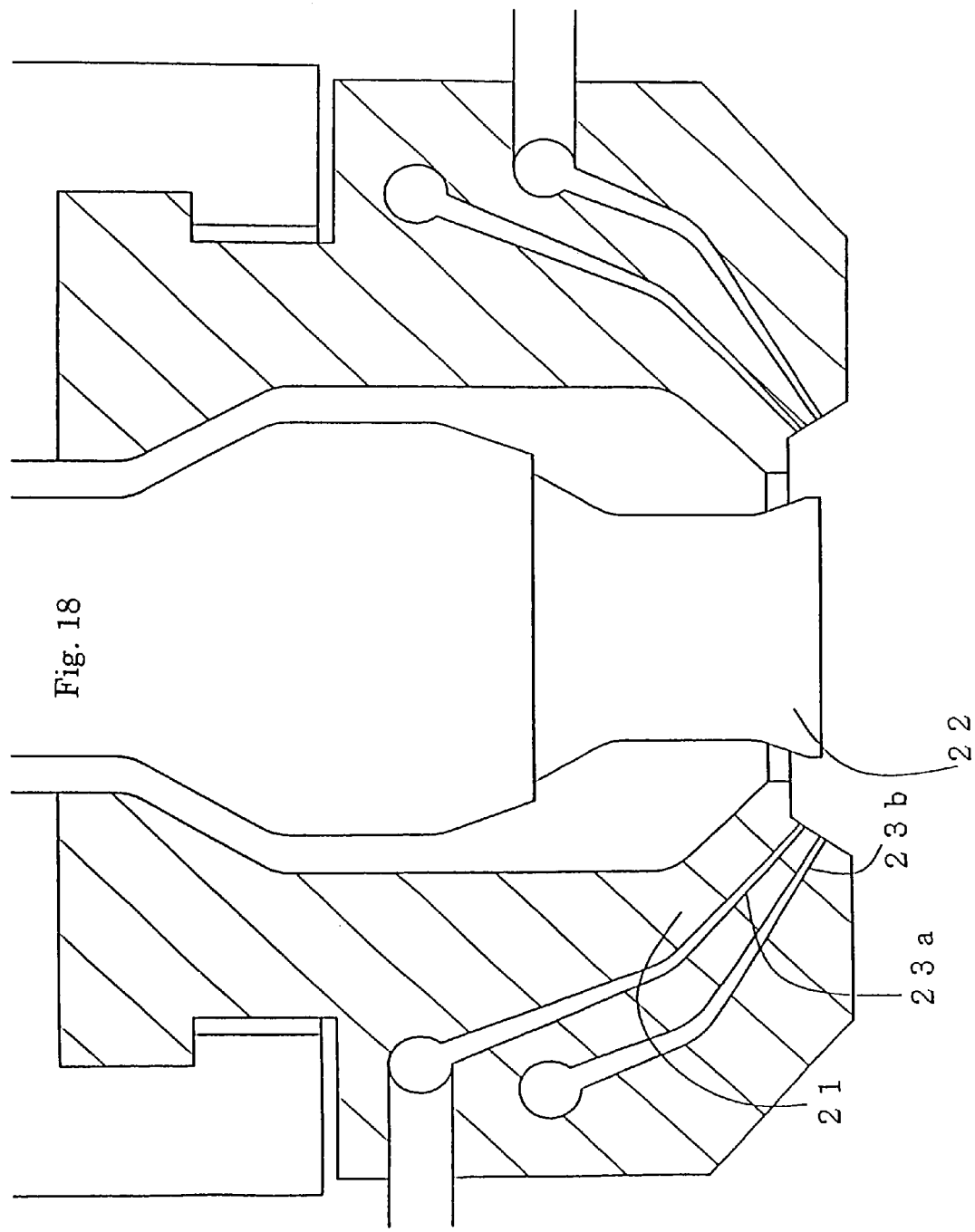
FIG. 18 is a diagrammatic sectional view of a parison molding device with a multilayer die head used in a method of manufacturing a bottle according to the second embodiment of the present invention.

The die head used in the method of manufacturing bottles can be either a monolayer die head as shown in FIG. 16 or a multilayer die head as shown in FIG. 18.

In the multilayer die head of FIG. 18, two discharge outlets 23a, 23b for adding resin to the parison are provided in the flow direction of the parison. Since different sub-extruders can supply resins to the outlets 23a, 23b, respectively, two kinds of resins with different material properties, colors or the like can be added to one and the same parison. Alternatively, the same sub-extruder can supply the same resin to the nozzles 23a, 23b.

In the monolayer and multilayer die heads, the discharge outlet 23 can be open along all the periphery of the core 22 to add resin to the entire periphery of the parison, or can be only partially open to add resin front part of the periphery of the core 22 (one or more positions).

Figure 17:
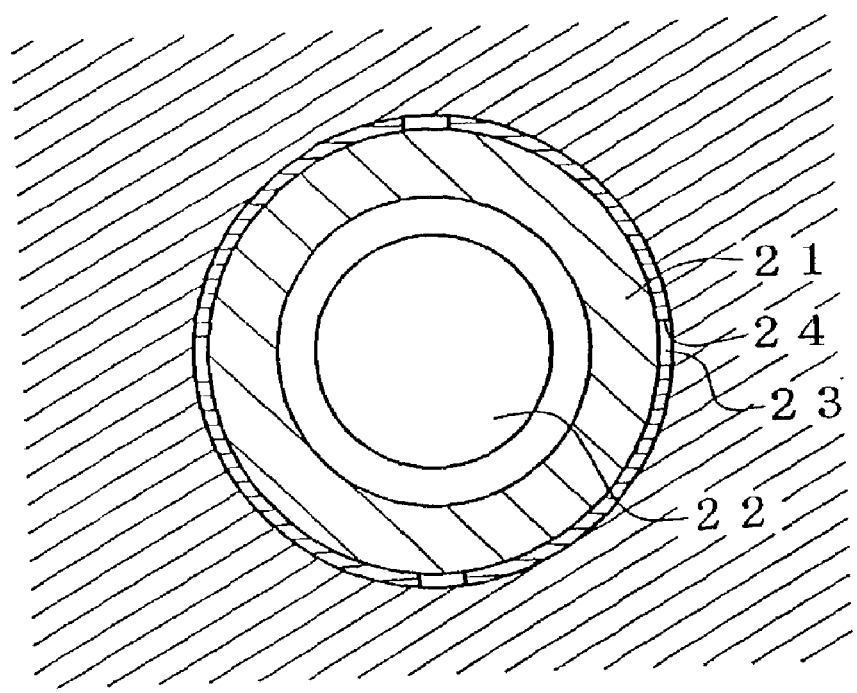
FIG. 17 is a sectional view of the die head of FIG. 16 with slits formed therein taken along line 17—17 in FIG. 16.

FIG. 17 is a sectional view of the die head of FIG. 16 taken along line 17—17 in FIG. 16. As shown in FIG. 17, the periphery of the outlet 23 surrounding the core 22 is closed except at four slits and resin is discharged only from the four slits 24. Such structure where the slits 24 are formed for the discharge of resin at part of the periphery surrounding the core 22 can be applied to a multilayer die head.

Figure 19:
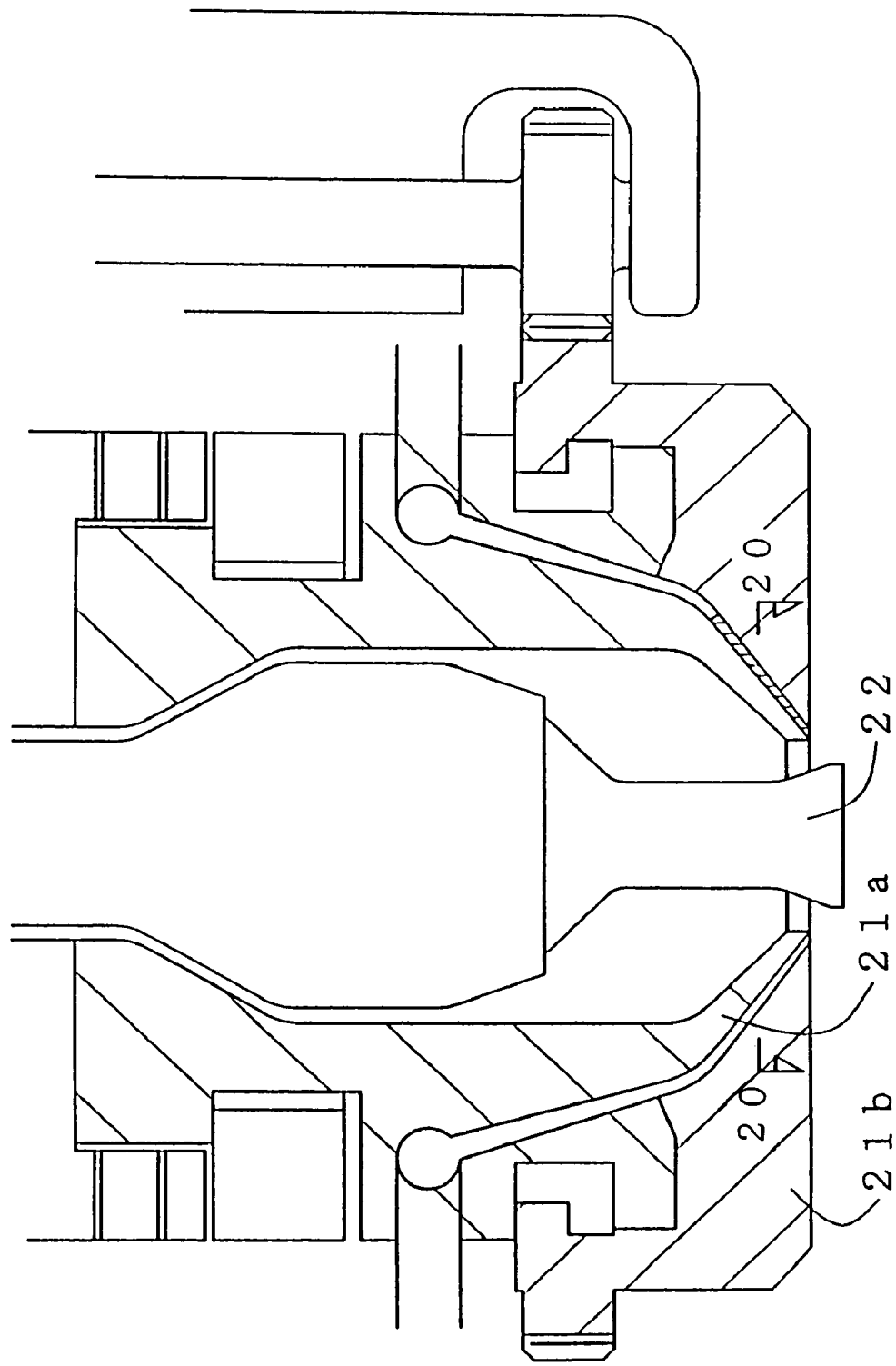
FIG. 19 is a diagrammatic sectional view of a parison molding device with a rotary die head used in a method of manufacturing a bottle according to the second embodiment of the present invention.
Figure 20:
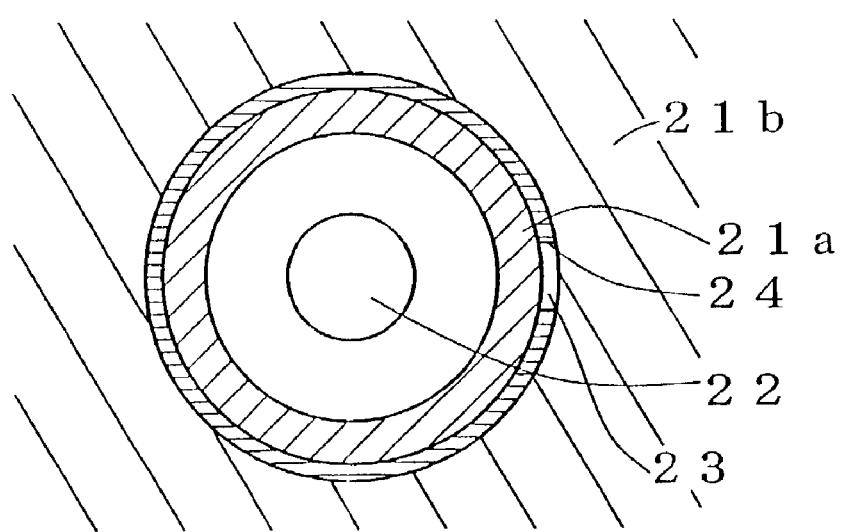
FIG. 20 is a sectional view of the die head of FIG. 19 taken along line 20—20 in FIG. 19.

FIG. 19 shows a rotary die head in which a discharge outlet (slit) for adding resin to the parison can rotate. FIG. 20 is a sectional view of the die head of FIG. 19 taken along line 20—20 in FIG. 19. The discharge outlet 23 is made of a fixed die part 21a and a rotary die part 21b, and a slit 24 is formed at only one portion of the rotary die part 21b as shown in FIG. 20. Alternatively, slits may be formed at a plurality of positions. The slit 24 can rotate around the core 22.

The relationships between these die heads and the bottle shapes will now be explained.

When using a monolayer die head with a discharge outlet 24 opening along the entire periphery of the core 22, a ring-like continuous thick part can be formed in the periphery of the bottle body. In this case, by adding resin one or more times at regulated intervals during the molding of the parison, one or more thick parts 4 can be formed in the direction of the height of the body 2 of the bottle 1. FIG. 5 shows a bottle formed with three ring-like continuous thick parts 2a.

When using a monolayer die head with slits 24 formed at plural positions of the periphery of the core 22 and adding resin for a short period of time, a ring-like discontinuous thick part can be formed in the periphery of the body 2 of the bottle 1. If resin is added three times for short periods of time during the extrusion and molding of the parison, a bottle with three ring-like discontinuous thick parts 2b can be formed as shown in FIG. 6.

When resin is continuously added for a long period of time during the molding of the parison, a bottle can be obtained that, as shown in FIG. 7, has a plurality of stripe-like thick parts 2c formed in the direction of the height of the body 2.

When resin is added three times with each succeeding addition being made a little longer that the previous one during the extrusion and molding of the parison, discontinuous thick parts 2d varying size are formed in the direction of the height of a body 1 as shown in FIG. 8.

Further if the width of a slit is increased, a patch-like thick part 2e can be formed as shown in FIG. 9.

When a multilayer die head with a discharge outlet 24 opening along the entire periphery of the core 22 is used, two, or a multiple of two, different thick parts 2f, 2g, . . . (of various widths, materials, colors or the like) can be formed in the periphery of the bottle body 1. The bottle shown in FIG. 10 can be formed by using a multilayer die head with an upper outlet and a lower outlet of narrower width than that of the upper outlet and adding resin twice during the molding of the parison. As a result, two ring-like continuous thick parts 2f, 2g with different widths are formed in the periphery of the body 2.

Figure 12:
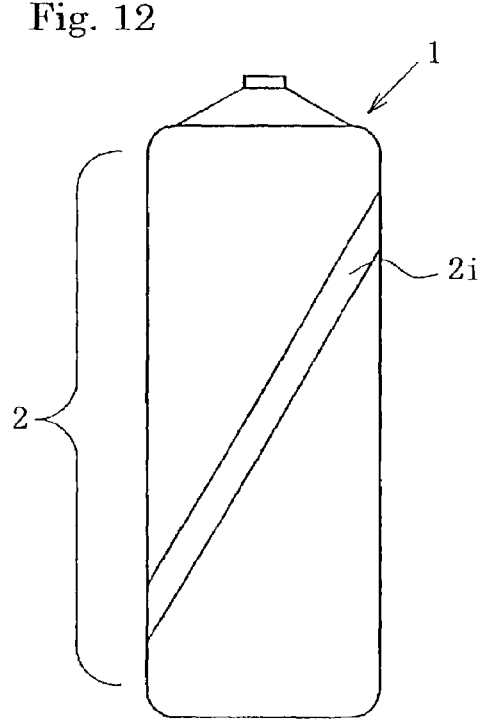
FIG. 12 is a front view of another bottle according to the second embodiment of the present invention.

When a rotary die head with slits 24 formed in one or plural positions of the periphery of the core 22 is used, the bottle shown in FIGS. 11 or 12 is obtained. In the case where the body 2 is a cylinder, if resin is continuously added from one slit while rotating the die head at a relatively high speed during the molding of the parison, a bottle with a thick part 2h helically formed on the cylinder body can be obtained as shown in FIG. 11. In the case where a body 2 is a square column, if resin is added from four slits while rotating the die head at a low speed during the molding of the parison, a bottle with thick parts 2i formed on each of the four side surfaces can be obtained as shown in FIG. 12.

The above-mentioned relationships between the die heads and the bottle shapes are just examples. Bottles of various shapes can be formed by changing or combining the shape of the discharge outlet of the die head (with or without a slit(s)); the number and width of a slit(s), and space between slits; the number of resin additions and the width and period of each addition during the molding of the parison; the number and width of the discharge outlets in a multilayer die head; the rotary speed of a rotary slit; and the like. Bottles of various shapes other than those shown in the drawings can be provided.

In the bottles according to the second embodiment of the present invention, since a specified part is thicker than the body proper, while maintaining the minimum practical thickness of the body, the strength, appearance and functionality of the container can be improved.

Resins that can be preferably used as the thermoplastic resin in the first and second embodiments include olefin resins such as high density polyethylene, low density polyethylene and polypropylene. These olefin resins can be used in combination with other resins such as ethylene-vinyl alcohol copolymers, polyamide resins, cyclic olefin resins and polyester resins.

The present invention is not limited to the above embodiments.

For example, the first and second embodiments can be simultaneously applied to one and the same plastic container.

The means for adding resin to the parison is not limited to the aforesaid combination of sub-extruder, switching unit and storage unit, and any of various other means, such as an injector, can be used instead. In the case of using an injector, the injection by the injector is controlled based on programmed instructions from a controller, like in the above embodiments. Further, an extruder with a reciprocating screw may be used. In this extruder, resin is stored when the screw is moved rearward.

According to the plastic container and method of manufacturing the container of the present invention described in the foregoing, a specified part of the container can independently be made thicker than the overall container thickness. Thus, in various plastic containers including bottles, isolated portions, such as the mouth, a part of the body desired liable to be bent or to have a decorative appearance, or a part desired to be collapsed in a certain direction, can be made thicker.

According to the method of manufacturing a plastic container of the present invention, the containers described in the foregoing can be easily and reliably manufactured.

INDUSTRIAL APPLICABILITY

As stated above, the present invention can be applied to the mouth or the body of plastic containers. In such containers, the mouth or a specified part of the body can be thickened independently of the remaining portions.

What is claimed is:

1. A plastic container comprising, a body, a mouth integrally formed with the body, and a thick part formed on the body to entirely surround the same at a desired longitudinal position thereof and having a thickness greater than that of the body, said thick part extending radially outwardly from an outer surface of the body and having two concave parts at diametrically opposed portions of the body extending inwardly of the body from the thick part.

2. The plastic container according to claim 1, wherein an inner surface of the body extends radially inwardly at the concave parts.

3. The plastic container according to claim 1, wherein said thick part has a band shape projecting outwardly from the outer surface of the body.

4. The plastic container according to claim 2, wherein said concave parts have a round shape.

* * * * *